United States Patent [19]

Betzing et al.

[11] 3,925,158

[45] Dec. 9, 1975

[54] PROCESS OF MANUFACTURING ENZYME PREPARATION RICH IN LIPASE

[75] Inventors: Hans Betzing, Horrem; Dac Lekim, Cologne, both of Germany

[73] Assignee: A. Nattermann & Cie. GmbH, Cologne, Germany

[22] Filed: Feb. 18, 1975

[21] Appl. No.: 550,641

[30] Foreign Application Priority Data

Feb. 21, 1974 Germany............................ 2408379
Jan. 30, 1975 Germany............................ 2505887

[52] U.S. Cl............................................ 195/66 R
[51] Int. Cl.².......................................... C07G 7/026
[58] Field of Search .................................. 195/66 R

[56] References Cited
FOREIGN PATENTS OR APPLICATIONS 1,328,202   8/1973   United Kingdom

*Primary Examiner*—Lionel M. Shapiro
*Attorney, Agent, or Firm*—Karl W. Flocks

[57] ABSTRACT

Enzyme preparation rich in lipase is obtained by treating comminuted pancreas tissue with a mixture of about 9 parts by volume of chloroform and one part butanol. The partly degreased tissue is then left standing at 0° – 4°C for 24 to 96 hours. Subsequently, it is degreased through treatment with acetone and is then dehydrated, which is followed by an extraction with a 5% aqueous ethanol solution. The extract is then mixed with acetone, the obtained precipitate is isolated and dried or the aqueous alcoholic extract is directly freeze-dried.

4 Claims, No Drawings

PROCESS OF MANUFACTURING ENZYME PREPARATION RICH IN LIPASE

FIELD OF INVENTION

The present invention relates to enzyme preparations and, more particularly, to the preparation of pancreas enzyme rich in lipase.

BACKGROUND

It has been known for a long time that lipasecontaining pancreas preparations may be used for the fermentative cleavage of fats. Numerous publications describe the concentration of the lipase in such enzyme preparations. Among other possibilities, such preparations are used in the treatment of indigestion and the effects thereof, whose causes are based above all on an insufficient excretion of the pancreas or on an insufficient production of the enzymes in question.

The enzyme preparations available commercially at the present time ordinarily exhibit lipase activities of 40 to 60 Willstatter units (WE)/g; a WE is an amount of enzyme that splits 24% oil in 2.5 g olive oil in one hour under determined conditions. However, the activity values of such preparations are very frequently unsatisfactory for therapeutic use in man, according to medical experience, since the deficiency of lipase cannot be compensated with the customary doses of the preparations.

British Pat. No. 1,328,202 discloses a process of preparing a pancreatin preparation possessing an activity higher than 3 × NF, in which connection NF indicates the minimal pancreastin activity of such preparations in relation to starch and casein, published by the National Formulary, XIIth Edition, of the American Pharmaceutical Association, Washington, D.C., U.S.A. According to this process, the comminuted pancreas glands are subjected first of all to an autolysis in an aqueous alkaline medium at a temperature of 20° – 30°C, prior to dehydration and removal of fat with propyl or butyl alcohol. However, the enzyme preparation obtained from the autolysed tissue material after such degreasing still exhibits a relatively low lipase activity.

SUMMARY

Now, it has been unexpectedly found that a strong increase in activity especially of the lipase is obtained in the extract material when the autolysis is performed at low temperatures after a partial degreasing and dehydration of the comminuted pancrease-gland material and subsequent extraction of the material. This could not have been expected, since in the process of the British Pat. No. 1,328,202 it was possible to increase substantially the amylase activity through the stage of autolysis, but it was not possible to have such an increase in the lipase activity.

It is, accordingly, an object of the invention to provide increased lipase activity in pancreatin enzyme. This and other objects and the nature and advantages of the instant invention will be more apparent from the following detailed description of various embodiments.

DETAILED DESCRIPTION OF EMBODIMENTS

According to the present invention, the process of preparing an enzyme preparation having a high content of lipase comprises treating the comminuted pancreas tissue with a mixture of about 9 parts by volume of chloroform and 1 part butanol. The partly degreased tissue is then left standing at 0° – 4°C for 24 to 96 hours. Subsequently, it is degreased through treatment with acetone and is then dehydrated, which is followed by an extraction with a 5% aqueous ethanol solution. The extract is then mixed with acetone, the obtained precipitate is isolated and dried.

Generally, the process of the invention is performed in such a manner that immediately after thawing the deep-cooled pancreas tissue is comminuted in a meat grinder or mixer together with a 9 : 1 mixture of chloroform and butanol. After the organic solvent is removed, the tissue is again treated with the same solvent mixture while being stirred and the solvent is again decanted, whereafter the still-moist residue is left standing at least for 24 hours, preferably 48 hours, in a cooler at 0° – 4°C, for the purpose of performing the autolysis.

After the autolysis, the already largely degreased tissue material is stirred thoroughly twice with acetone and the solvent is separated in each case. For isolating the enzyme material which is rich in lipase, the dry tissue powder is repeatedly stirred with a mixture of water and ethanol (volume ratio 95 : 5), the solutions separated from the tissue are combined and the precipitate is separated through addition of acetone and subsequent centrifugation of the so formed suspension. The precipitate is then treated with acetone and, subsequently, dried in vacuo. The obtained preparation is a fine gray-white powder possessing an unusually high lipase activity.

Since in the obtained water-alcohol extracts the enzyme already is present in a high degree of purity, such 5% alcohol extracts may also be employed in accordance with an embodiment of the process directly for the production of the lipase preparation, by subjecting the combined extracts to freeze drying in which the enzyme preparation rich in lipase is obtained in the form of dry, gray-white powder. The advantage of this modification of the process is based on the fact that recovery is simplified, i.e. the precipitation of the enzyme preparation with acetone and the isolation of the obtained precipitate through filtering or centrifugation are eliminated. In addition to a great economy of time, this procedure especially results also in the saving of large amounts of acetone, whose recovery is rendered difficult because of the water content. The activity of the lipase preparation thus obtained corresponds to that of the enzyme obtained through the precipitation with acetone.

The following working examples are offered illustratively:

EXAMPLE I

After thawing, 5.0 kg deep-cooled hog pancreas are freed of adhering fat, coarsely comminuted and homogenized with 5 l of a mixture of chloroform-butanol (9 : 1) in a mixer or meat grinder. The formed organ paste is stirred for 30 minutes at room temperature, the chloroform-containing liquid phase is decanted off and the residue is then still stirred twice, with 5 l chloroform-butanol (9 : 1) in each case, for 30 minutes at room temperature, and the solvent is decanted off in each case. The residue which is still moist is then left alone for 48 hours at 0° – 4°C. Subsequently, the organ paste, which is thus largely degreased, is stirred thoroughly twice, with 2.5 l acetone in each case, for 15 minutes, and the supernatant solution is decanted off in each case.

For extracting the ferments rich in lipase, the resultant entirely degreased paste is then stirred twice for 30 minutes, with 2 l of a mixture of water and ethanol (95 : 5) in each case, and the solution is filtered off subsequently. The separate water-ethanol extracts are combined and stirred with 5 l acetone for 15 minutes at room temperature, for the purpose of precipitating the pancreas ferments. After centrifugation to recover the precipitate, it is wahsed three times with 1.6 l acetone in each case. Then the washed pancreas ferment precipitate is dried in vacuo and comminuted.

Yield: 450 g (9% in regard to the moist organ) of a yellowish powder having a lipase activity of 270 WE/g.

EXAMPLE 2

Two kg of freeze-dried hog pancreas are extracted three times for 30 minutes, with 5 l chloroform-butanol (9 : 1) in each case, while being stirred, and the solvent is decanted off in each case. The moist residue is then left alone for 60 hours at 0° –4°C. In order to complete the degreasing, the material is then stirred twice for 15 minutes, with 2.5 l acetone in each case, and filtered in each case from the solvent.

For extracting the pancreas ferments, the degreased organ residue is treated twice for 30 minutes with 2 l of a mixture of water and ethanol (95 : 5) in each case, while stirred, the solution being filtered off in each case from the residue. The combined water-ethanol extracts are stirred with 5 l acetone for 15 minutes at room temperature, and the resultant precipitated ferments rich in lipase are separated by centrifugation. The precipitate is then washed three times with 1.6 l acetone in each case, dried in vacuo and comminuted.

EXAMPLE 3

Three kg of deep-cooled hog pancreas is comminuted very finely in a meat grinder and homogenized in a mixer with 3.0 liter of a mixture of chloroform-butanol at 9:1 v/v. The corresponding organ paste is stirred for 30 minutes at room temperature, the chloroform-containing liquid phase is drained off and the residue is further stirred twice for 30 minutes at room temperature, in each case with 3.0 l chloroform-butanol at 9:1 v/v and the solvent is separated in each case. The still-moist residue is then left alone for 48 hours at 4°C and the largely degreased organ is subsequently again stirred twice for 15 minutes, in each case with 1.5 l acetone and the supernatant solution is decanted off in each case.

In order to extract the pancreas ferments that are rich in lipase, the entirely degreased material is stirred twice for 30 minutes, in each case with 1.5 liter of a mixture of water and ethanol at 95:5 v/v and the solution is then filtered through a metal screen. The combined water-ethanol extracts are freeze-dried to remove the solvent, using the following conditions: Thickness of liquid layer about 1 – 2 cm, initial temperature −20°C, final pressure $10^{-4}$ torr, final temperature 20°C. The dried porous material is comminuted and screened.

Yield: 365 g (12% in regard to the moist organ) of a light yellow powder having a lipase activity of about 250 Willstatter units/g, corresponding to 110 000 FIP units/g.

A comparison of the pancreatin produced in accordance with the examples of the British Patent with a product prepared in accordance with the process of the present invention shows that, through the gentle autolysis of the present invention, without an addition of bases or acids, namely by merely standing alone for at least 24 hours at 0° – 4°C and with the modified refining-concentration method, one obtains a pancreatin preparation that possesses a substantially higher lipase activity.

TABLE 1

| Duration of autolysis in hours | Activity | |
|---|---|---|
| | Autolysis at room temperature | Autolysis at 0 – 4°C |
| 0 | 100% | 100% |
| 24 | 97% | 110% |
| 48 | 52% | 150% |
| 96 | — | 140% |

The decisive role of the temperature at which the autolysis takes place follows clearly from the following table:

| Pancreatin preparation | Lipase activity in WE/g |
|---|---|
| produced in accordance with Example 1 of the British Patent 1,328,202 | 95 |
| produced in accordance with the process of the present invention | 240 |

The following Table 2 shows the lipase activities of two commercial pancreatin preparations in comparison with the corresponding activities of the products rich in lipase, as obtained in accordance with the process of the present application, the lipase activities being determined by the method of Willstatter and Lazo-Wasem in Willstatter and Wilson units, respectively.

TABLE 2

| Product | Lipase activity in accordance with Willstatter | Lipase activity in accordance with Lazo-Wasem (in Wilson units) |
|---|---|---|
| Commercial 4-NF-product | 45 WE/g | 2060 units/g |
| Commercial 5/6-NF-product | 56 WE/g | 2450 units/g |
| Product of the invention | 239.6 WE/g | 8000 units/g |

In these experiments the lipase activity was determined in accordance with Willstatter (Hoppe-Seylers 125 (1923) 193) modified according to Vogel and Laeverenz (Hoppe-Seylers 234 (1935) 176), by foaming 2 – 3 mg of the pancreas preparation in 5 ml water and 2 ml $NH_3$-$NH_4Cl$-buffer of pH 9.2, then mixing in each case with 2 ml of (2.4%) egg albumen solution, (1.6%) $CaCl_2$ solution and (1.6%) sodium oleate solution and finally adding to 2.5 g. olive oil. The preparation was vigorously shaken for a few seconds and then mixed thoroughly in a magnetic stirrer for 60 minutes at 30°C. Then the cleavage was interrupted by adding 100 ml ethanol and, after the addition of 20 ml ether and 12 drops of 1% alcoholic thymolphthalein solution, the material was titrated to blue color with 0.5 n alcoholic KOH. From the consumption of lye thus determined, one substracts the consumption of the blank test that is started simultaneously with the main test, with the difference that the olive oil is added only after the addition of alcohol and ether, i.e., shortly before the titration. From the percentage of cleavage thus obtained, the corresponding lipase units are calculated by means of an empirically determined calibration curve. The Willstatter units (WE)/g are obtained by multiplying the lipase units with the factor $$\frac{1000}{\text{mg weight-in amount}}$$

When the lipase is determined in accordance with E. A. Lazo-Wasem [J. of Pharm. Sciences 50 (1961) 999], the olive oil is treated with the enzyme preparation for 30 minutes at 37°C and at a pH value of 7.8 while beef gall is added. After the acidification the split-off fatty acids are extracted with benzene and titrated with phenolphthalein as indicator.

It turns out that the lipase activities of the enzyme preparations of the invention are situated far above the values of the commercial pancreatin products in accordance with both methods of determination. Stability tests have shown that the high lipase activities on which the novel enzyme preparations of the present invention are based do not show practically any change when stored for several months at room temperature.

It is particularly important that the novel pancreatin preparations of the present invention are not only strongly enriched in regard to lipolytic enzymes but, even if to a lesser extent, also exhibit an increase in protease and amylase activities in relation to the customary commercial pancreatins. In the following Table 3, the protease, amylase and esterase activities of the pancreatins of the invention are compared with a commercial 5/6-NF-product.

It is clear that the process of the invention strongly enriches especially the lipase activity.

It will be obvious to those skilled in the art that various changes may be made without departing from the scope of the invention and the invention is not to be considered limited to what is shown and described in the specification.

What is claimed is:

1. In a process of preparing an enzyme preparation rich in lipase by comminution of pancreas tissue, autolysis, removal of fat and aqueous extraction of the tissue, and recovery of the enzyme from the aqueous extract, the improvement wherein:
    the comminuted pancreas tissue is first partially degreased with a mixture of about 9 parts by volume of chloroform and 1 part by volume butanol, then the partially degreased tissue material is left standing for 24–96 hours at 0° – 4°C to effect autolysis, and then after said aqueous extraction, said recovery is carried out.

2. A process in accordance with claim 1, wherein after said autolysis the tissue is degreased with acetone and dehydrated, whereafter extraction is performed with 5% aqueous ethanol solution and the dry enzyme preparation is recovered from the extract.

3. A process as in claim 1, wherein the partly degreased tissue is left standing for 48 hours at 0° – 4°C.

4. A process in accordance with claim 1, wherein following said aqueous extraction, said recovery is effected by freeze drying the aqueous extract.

* * * * *

TABLE 3

| | Protease in accordance with N. Hennrich, F.I.P. J.Mond.Pharm. 1968, 3 p. 337–354 | | Amylase in accordance with N.Hennrich, F.I.P. (hydrolysis sol. starch at pH 6.8) J.Mond.Pharm. 1968, 3 p. 337–354 | | Esterase in accordance with E.A. Lazo-Wasem and J.Melcer et al. U.S.Pat. No. 3,168,448 (Triacetin substrate) | |
|---|---|---|---|---|---|---|
| Commercial 5/6-NF-product | 1 | units+ | 11 | FIB-units/mg | 1500 | Wilson-units/g |
| preparation of the invention | 1.57 – 2.16 | units | 12 – 13 | FIB-units/mg | 4800 – 6000 | Wilson-units/g |

+random determination: it corresponds to 5.04 μmol equivalent of tyrosine released through 80γ pancreatin at pH 7.5